Figure 1:
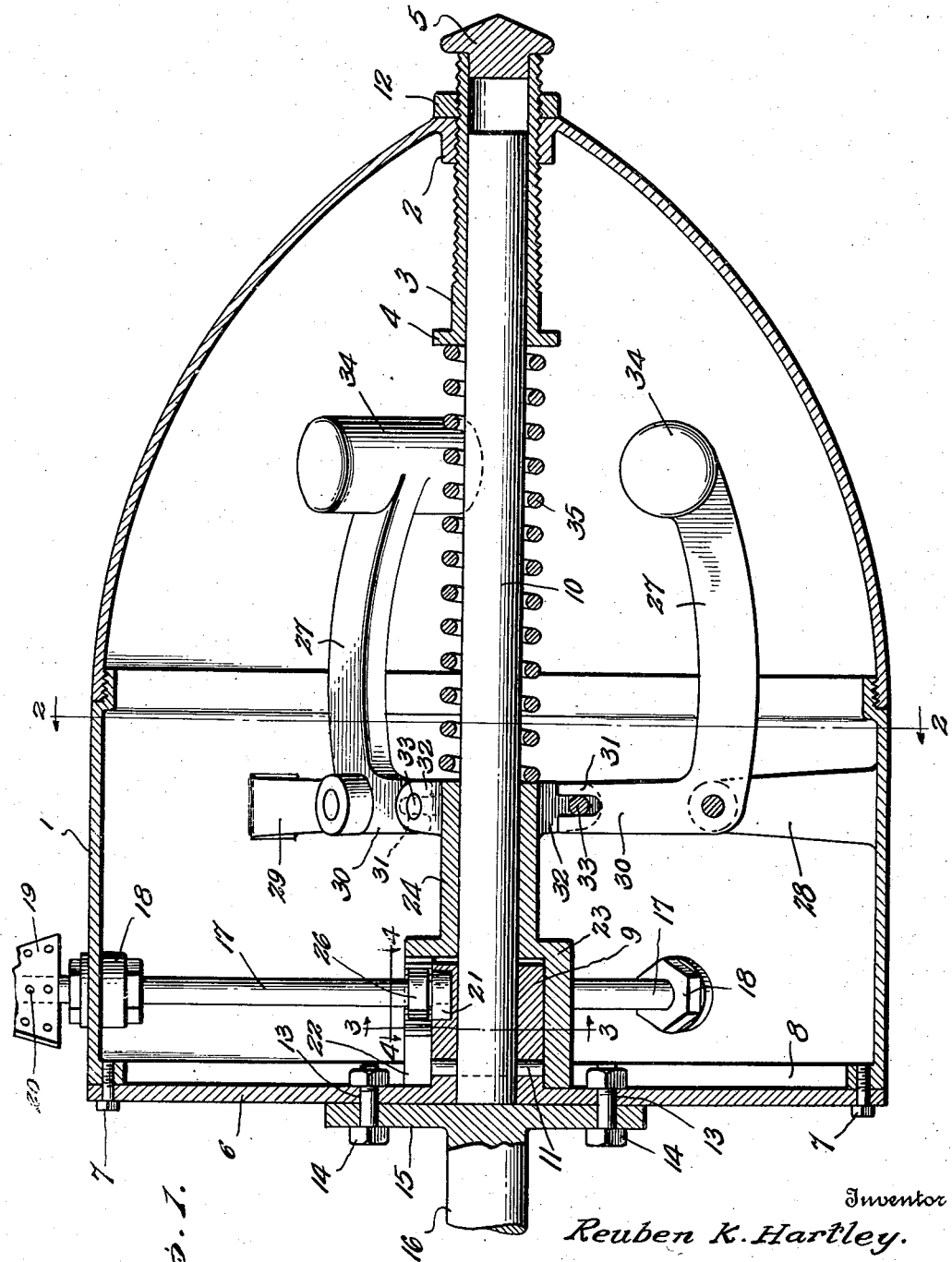

Dec. 13, 1938.                R. K. HARTLEY                 2,139,954
                                WIND WHEEL
                           Filed July 23, 1937         2 Sheets-Sheet 1

Inventor
Reuben K. Hartley.
By Lacey & Lacey,
Attorneys

Dec. 13, 1938.                R. K. HARTLEY                2,139,954
                                WIND WHEEL
                           Filed July 23, 1937        2 Sheets-Sheet 2
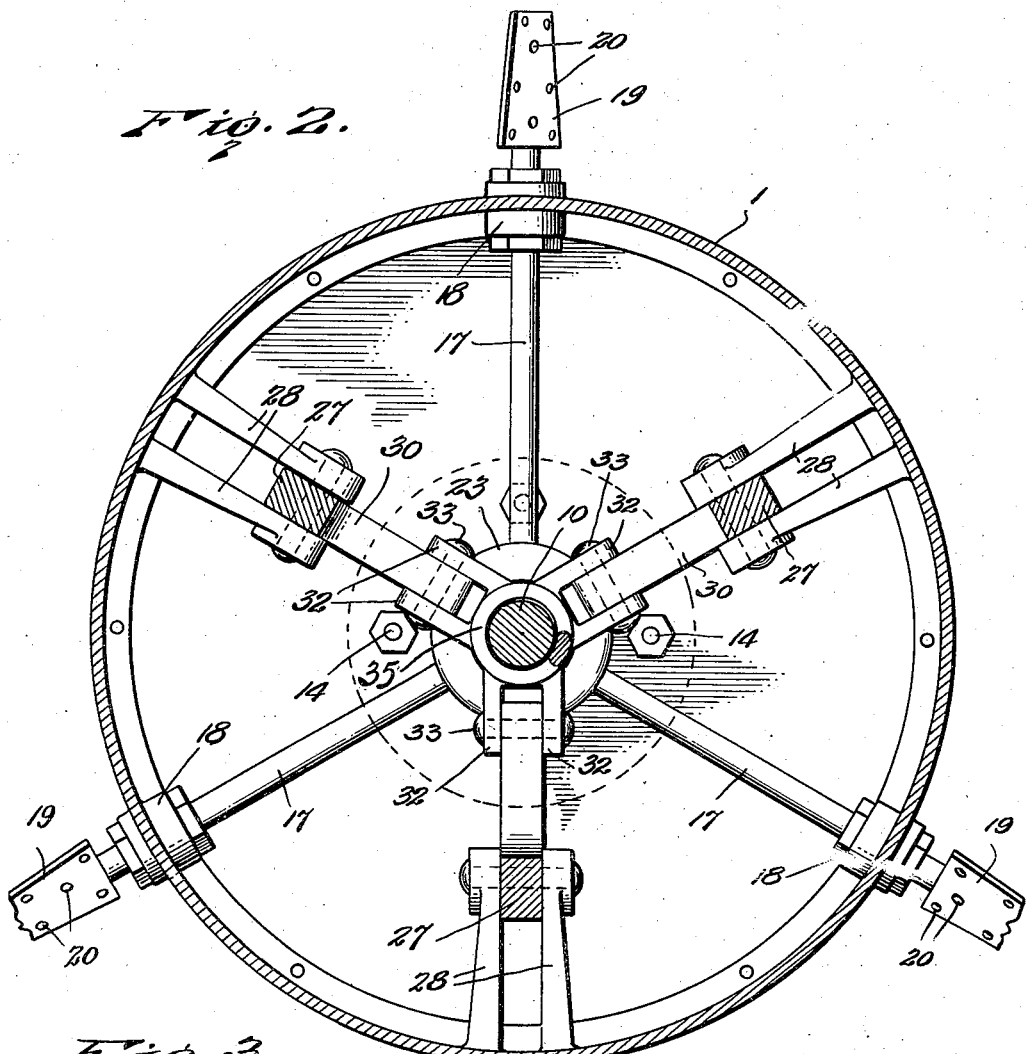
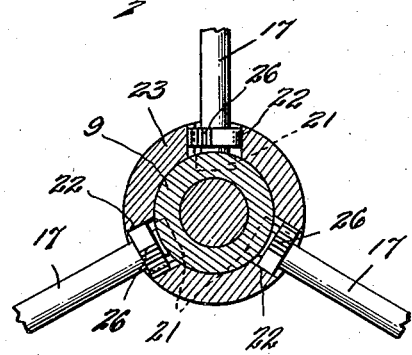
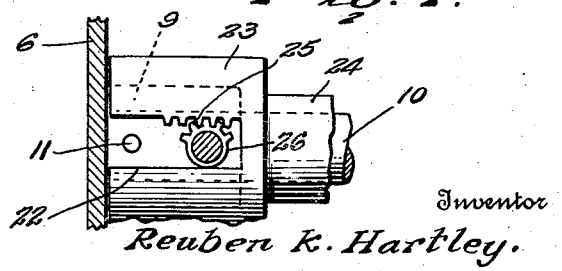
Inventor
Reuben K. Hartley.
By Lacey & Lacey, Attorneys Patented Dec. 13, 1938

2,139,954

UNITED STATES PATENT OFFICE 2,139,954

WIND WHEEL

Reuben K. Hartley, Hamilton, Mo.

Application July 23, 1937, Serial No. 155,305

3 Claims. (Cl. 170—68)

This invention relates to a wind-wheel for use upon a wind driven device which may be a windmill, generator or any other machine or the like having a main shaft with which the wind driven propelling means may be associated.

One object of the invention is to provide a device of this character wherein the shafts carrying the blade are so mounted that they may be rotated and thus dispose the blades at such an angle with respect to the wind that the speed at which the shaft to which the device is secured rotates may be maintained substantially constant.

Another object of the invention is to provide the device with adjusting means for the shaft carrying the propeller blade including weighted governor arms so mounted that, when the rate at which wind is blowing increases, centrifugal force will impart movement to the arms of the governor and rotary motion imparted to the blade-carrying shaft so that the angle of the blade relative to the air current will be adjusted and the shaft to which the device is attached caused to rotate at the same speed imparted to it when the wind was blowing at a slower speed. It will thus be seen that, although the speed at which the wind blows may vary at times, the speed at which the shaft to which the device is secured turns will be set constant.

Another object of the invention is to provide a device of this character wherein the governor arms are connected with a sleeve shiftable along a shaft extending axially of the shaft to which the device is attached. It will thus be seen that the longitudinal center of the device will be in alinement with the longitudinal axis of the shaft to which the device is secured and the device and the shaft to which it is attached may rotate without either being subjected to torsional strain.

Another object of the invention is to provide a device of this character including a body which tapers toward its front end to reduce wind resistance and to further so construct the device that the adjusting mechanism for the shaft carrying the blade will be enclosed within the body and thus protected from exposure.

The invention is illustrated in the accompanying drawings, wherein—

Figure 1 is a sectional view taken longitudinally through the improved wind-wheel and showing the same secured to a shaft which is to be driven by the propeller, Figure 2 is a sectional view taken transversely through the wind-wheel along the line 2—2 of Figure 1, Figure 3 is a fragmentary sectional view taken along the line 3—3 of Figure 1, and Figure 4 is a fragmentary sectional view taken transversely through one of the blade-carrying shafts along the line 4—4 of Figure 1.

The body of this improved wind-wheel is in the form of a hollow shell which tapers towards its forward end in order to prevent undue wind resistance when the wind-wheel is in use. An inwardly extending internally threaded sleeve 2 is formed about an opening provided at the forward end or tip of the body and through this sleeve or collar is threaded a tube 3 having an outstanding flange 4 about its inner end and having its outer end closed by a plug 5. The rear end of the body is closed by a head or plate 6 secured by screws 7 which pass through openings formed adjacent margins of the plate and are screwed into threaded sockets formed in an inwardly extending flange 8 provided about the rear end of the body. An inwardly extending sleeve 9 is formed integral with the closure plate 6 about an opening located centrally thereof and this sleeve receives the rear end of a rod 10 which extends along the longitudinal axis of the body with its forward end portion engaged in the tube 3 and its rear end portion firmly secured in the sleeve 9 by a pin 11. The forward end portion of the rod is freely received in the tube 3 in order that this tube may be turned to longitudinally adjust it through the threaded sleeve or collar 2 and the tube 3 then firmly secured in its adjusted position by tightening the nut 12. A suitable number of openings 13 are drilled through the closure plate in radial spaced relation to the sleeve 9 to receive bolts 14, by means of which the wind-wheel is secured to the end disks 15 of a shaft 16. This shaft constitutes the drive shaft of a windmill, generator or the like which is to be set in motion and driven by the wind-wheel.

A number of blade carrying shafts 17 extend radially of the body through bearings 18 carried by walls of the body in spaced relation to each other circumferentially thereof. While three of these blade carrying shafts have been shown in the drawings, it will be understood that any number desired may be provided. At their outer ends the shafts 17 carry flat plates 19 to which propeller blades are to be secured by bolts or other suitable fasteners passed through openings 20 formed through the plates. It will thus be seen that the propeller blades which may be of any suitable dimension will be firmly secured and their angular relation to a draft of air may be adjusted by turning the shaft. Inner ends of the radially extending shaft are rotatably mounted in bearings or sockets 21 carried by the sleeve 9 in radially spaced relation to each other. The radially extending shafts also pass through slots 22 formed in a cup or head 23 carried by a sleeve 24 which fits loosely about the rod 10. The cup-shaped head 23 fits snugly about the sleeve 9 and along one side wall of each of the slots 22 there have been formed teeth constituting a rack 25 which meshes with the teeth of a segmental pinion 26. The pinions 26 are formed integral with or firmly secured upon the radially extending shaft 17, and from an inspection of Figures 1 and 4, it will be readily seen that, when the sleeve or shank 24 and the cup-shaped head 23 are shifted longitudinally of the rod 10, the rack 25 will serve to impart rotary motion to the shaft 17 and turn the shaft a partial revolution. Therefore, the blades carried by the plate at the outer ends of the shaft will be angularly adjusted and disposed at such an angle that the body portion and the shaft 16 to which it is secured will be rotated at a predetermined rate of speed. The angular disposition of the blades is such that, when a light breeze is blowing, the shaft 16 will be turned at a predetermined rate of speed. As the force of the wind increases, the shafts will be gradually turned by means to be hereinafter set forth for shifting the sleeve or shank 24 longitudinally of the rod 10 and the blades of the propeller will at all times be so disposed with respect to the moving air current that the body portion of the wind-wheel and the shaft 16 will continue to rotate at the predetermined rate of speed. It will thus be seen that a generator, windmill or the like will be operated at an even speed instead of being operated slowly when a light breeze is blowing and at an exceedingly high rate of speed when a very strong wind is blowing.

In order to cause the sleeve 24 and the cup-shaped head 23 to be shifted along the rod 10 in response to variations in the force of the wind, there have been provided governor arms 27 which are of a bell crank construction. These governor arms or bell crank levers are pivotally mounted between pairs of bearing brackets 28 which extend inwardly from walls of the body radially thereof in such spaced relation to each other that the governor arms are disposed substantially midway the radially extending shaft 17 when viewed, as shown in Figure 2. The arms 30 of the bell crank levers extend radially of the body and terminate in forks 31 which fit between arms 32 carried by the sleeve or shank 24 and engage pins 33 carried by the arms 32. Weights 34 are formed integral with or otherwise firmly secured at free ends of the governor arms 27, and from an inspection of Figure 1, it will be readily understood that, when the wind-wheel is in operation and turned by wind acting upon the blades carried by outer ends of the shaft 17, centrifugal force set up will cause the weights to swing outwardly toward walls of the body. As the governor arms swing outwardly, their arms 30 will cause the sleeve 24 and its head 23 to be shifted forwardly along the rod 10 and turning motion will be imparted to the shaft 17 to angularly adjust the propeller blades and cause them to be disposed at such an angle that the wind-wheel and the shaft to which it is secured will continue to rotate at a predetermined rate of speed. A helical spring 35 which is coiled about the rod 10 with one end abutting the forward end of the sleeve 24 and its other end bearing against the flanged inner end of the tube 3 yieldably resist forward movement of the sleeve 24 and return this sleeve to its rearward position when no wind is blowing. It will thus be seen that, when the velocity of the wind decreases, the spring will serve to shift the sleeve 24 rearwardly and thus maintain the blades of the wind-wheel at the proper angle for rotating the shaft 16 at the predetermined rate of speed. By adjusting the tube 3 through the sleeve or collar 2 the tension of the spring 35 can be regulated and thus proper operation of the wind-wheel assured.

Having thus described the invention, what is claimed as new is:

1. In a wind-wheel, a hollow body adapted to have its rear end secured to a rotatable shaft, a rod extending longitudinally through the body axially thereof, a bearing for the front end of said rod carried by said body and adjustable longitudinally of the rod, blade-carrying shafts journaled through walls of the body and extending radially of the body, blades carried by said blade-carrying shafts, pinions carried by inner end portions of the blade-carrying shafts, a member carried by said rod and slidable longitudinally thereof and provided with racks engaging the pinions, a spring about said rod between the bearing and said member, said spring being tensioned by said bearing and yieldably resisting forward movement of said member, and governor arms mounted in said body and engaged with said member and adapted to be actuated by centrifugal force to shift the member longitudinally upon said rod and impart rotary motion to the blade-carrying shafts to dispose the blades carried by the blade-carrying shafts in predetermined angular relation to a current of air moving longitudinally of the body.

2. In a wind-wheel, a hollow body adapted to have its rear end secured to a rotatable shaft to be driven, a socket within the body extending from the rear end of the body longitudinally thereof, a rod extending longitudinally through said body with its rear end portion mounted in said socket, a support for the front end of said rod adjustable longitudinally thereof, blade-carrying shafts journaled through walls of the body and extending radially of the body with their inner ends rotatably supported by said socket, pinions carried by the blade-carrying shafts, blades carried by said blade-carrying shaft, a rack member fitting about said socket and having a shank extending along said rod, said rack member having rack teeth meshing with the pinions, a spring about said rod to yieldably resist forward movement of the rack member and its shank along said rod, said spring being engaged and tensioned by said adjustable support, and governor means mounted in said body and engaged with said shank and adapted to be actuated by centrifugal force when the body is rotating to shift the rack member and its shank forwardly along the rod and impart rotary motion to the blade-carrying shafts and dispose the blades carried thereby in predetermined angular relation to a current of air moving longitudinally of the body.

3. In a wind-wheel, a hollow body, a head for the rear end of said body, a sleeve extending from said head into the body axially thereof, a tube threaded through the front end of said body in axial alinement with said sleeve, means for securing said tube in a longitudinally adjusted position, a rod extending longitudinally in said body with its rear end secured in said sleeve and its front end freely engaged in said tube, blade-carrying shafts journaled through walls of said body with their inner ends rotatably supported by said sleeve, blades carried by outer ends of said blade-carrying shafts, pinions carried by the blade-carrying shafts, a cup fitting about said sleeve and having a shank engaged about said rod, said cup being formed with longitudinally extending slots receiving the blade-carrying shafts and provided with racks meshing with said pinions for rotatably adjusting the blade-carrying shafts and disposing the blades carried thereby in predetermined angular relation to a current of air moving longitudinally of the body, a spring about said rod engaging the shank and tube and yieldably resisting movement of the shank and cup longitudinally of the rod away from said sleeve, bearing brackets extending from walls of the body radially thereof toward said rod, and weighted governor arms pivoted to said brackets and engaged with the shank of said cup.

REUBEN K. HARTLEY.